United States Patent [19]
Williamson

[11] Patent Number: 4,531,218
[45] Date of Patent: Jul. 23, 1985

[54] GLASS MELTING FURNACE

[75] Inventor: Michael Williamson, Newark, Ohio

[73] Assignee: Owens-Corning Fiberglas Corporation, Toledo, Ohio

[21] Appl. No.: 505,546

[22] Filed: Jun. 17, 1983

[51] Int. Cl.³ .............................................. C03B 5/02
[52] U.S. Cl. ......................................... 373/39; 373/41
[58] Field of Search .................. 373/39, 40, 41, 27, 373/135, 136

[56] References Cited

U.S. PATENT DOCUMENTS

| | | | |
|---|---|---|---|
| 3,140,334 | 7/1964 | Penberthy | 373/41 |
| 3,395,237 | 7/1968 | Orton | 373/41 |
| 3,417,186 | 12/1968 | Blumenfeld | 373/41 |
| 3,961,136 | 6/1976 | Maddox | 373/41 |
| 3,985,944 | 10/1976 | Maddox | 373/41 |
| 4,211,887 | 7/1980 | Williamson | 373/41 |
| 4,282,393 | 8/1981 | Williamson | 373/41 |
| 4,324,942 | 4/1982 | Williamson | 373/39 |

FOREIGN PATENT DOCUMENTS

WO80/01907  9/1980  PCT Int'l Appl. .................. 373/41

Primary Examiner—A. D. Pellinen
Assistant Examiner—Greg Thompson
Attorney, Agent, or Firm—Ronald C. Hudgens; Patrick P. Pacella; Ronald E. Champion

[57] ABSTRACT

A glass melting furnace which uses Joule effect heating between electrodes, has a parallel attachment of electrodes to a single power source. The electrodes are arranged in rows of four electrodes across the width of the furnace. Multiple rows of electrodes spaced along the length of the furnace are used. The electrodes within a row are connected in a parallel format such that the current flow within a row can only be between two electrodes which are adjacent to each other. A current limiting controller and thermal currents within the molten glass balancing the temperature within the molten glass.

9 Claims, 2 Drawing Figures

GLASS MELTING FURNACE

TECHNICAL FIELD

A furnace for melting glass is disclosed. In particular, an apparatus and method for melting glass by Joule effect heating is described wherein an array of electrodes electrically and conductively engage the molten glass. The electrode array is divided into rows of four electrodes. Individual electrodes within the row are connected together in a parallel method to a single transformer in such a manner that the current flowing in the molten glass can only occur between two pair of adjacent electrodes. This arrangement allows a single higher capacity transformer to fire four electrodes thus reducing the area required to house the transformer and reducing the total cost of the transformers involved.

BACKGROUND ART

Electrically operated glass melting furnaces which use Joule effect heating by means of spaced apart electrodes normally have a single power transformer which is connected across a pair of electrodes. If there are n electrodes in the electrode array, then there would be n divided by two transformers supplying power to the electrode array. This type of firing scheme is described by Orton, U.S. Pat. No. 3,395,237. Orton controlled the hot spots within the furnace by putting a current limiting controller in line with one branch of each transformer and firing the electrodes across an adjacent electrode. This inherently gave a warmer area in the center of the furnace than on the sides of the furnace. Convection currents within the molten glass allowed the glass to be mixed during the melting process. The convection currents which exist within in a glass melting furnace were described by Penberthy, U.S. Pat. No. 3,140,334. The glass nearest to the electrode and between two electrodes which conduct the current from one electrode to the other is inherently hotter than the rest of the glass surrounding the glass melt. The glass flows upwards and outwards away from the electrode or hot spot toward areas of cooler glass. Even with the convection current flow in mixing, as described by Penberthy, and the cross firing, as described by Orton, two major problems still occur with the glass melting furnace. The first problem is that hot spots occur within the Orton design, especially at the center of the furnace. The second problem is that space must be provided for every power transformer to fit within the area of the melting furnace.

DISCLOSURE OF THE INVENTION

The present invention uses an array of electrodes placed in a recepticle which holds the molten glass. The array of electrodes is spaced in rows having four electrodes across the recepticle. There are provided a number of rows of electrodes. A single fused switch bank, a power transformer and a current limiting controller are provided for each row of electrodes. The electrodes within a row are connected in a parallel format with the output of the controller which is fed by a single transformer. The controller is providing AC current to the electrodes. Although AC current is being supplied, if we consider the first side of the output of the controller as being positive and the second side of the output of the controller as being negative, the electrodes within an array are configured in such a manner that the closest electrode in the row to the near wall is connected to the positive side. The next two are connected to the negative side. The last electrode is connected to the positive side of the controller. This gives a balanced arrangement within the row with a virtual ground in the center of the furnace. In this manner, the firing can only be between two electrodes in the array, all electrodes being fed the same current due to the parallel connection. In this manner, a single transformer can be used to fire four electrodes in a single row. If, for instance, two electrodes were fired by a transformer of size A, then four electrodes could be fired by a transformer of the size 2 A. The input fused switch bank is connected across two sides of a three wire, three phase AC power source. Adjacent rows of electrodes can be connected to this power source such that phasing between adjacent rows can be controlled. If desired, phasing can be altered by reconnecting the individual switch banks to the individual input lines of the three phase power source. Two benefits are derived from this configuration of firing. The first is the physical size of the transformers required to do the firing. In a configuration of a furnace which follows the teachings of Orton, a 500 KVA transformer is required for each pair of the four electrodes within a row. In the present invention, a row consisted of four electrodes and a 1,000 KVA transformer would accomplish the same end. A 500 KVA transformer, such as Model 3HV0500 manufactured by Magnetics Division of Spang Industries, has a physical size of approximately 78" wide, 74" high and a depth of 44". A similar 1,000 KVA transformer, Model 3HV1000 manufactured by the same company, ʰ a physical size of approximately 90" wide, 86" ʰˑ 48" deep. The cost of 1,000 KVA transformer ͺ imately 60% to 70% of the cost of two 500 KVA formers. A current limiting controller is placed acͺ the output side of the 1,000 KVA transformer. Thͺ prevents the current from exceeding a preset and programmable level. If one area of the furnace attempts to get hotter than an adjacent area, the convection currents in that particular area will be upwelled and spread throughout the adjacent furnace area to mix the hotter glass with the colder glass. This then tends to equalize the resistance of the glass and stabilize the current flow across adjacent electrodes. The glass between two firing electrodes within a row can be considered as an infinite group of series connected resistors. The controller units limit current flow to a preset level. If a finite area of glass between two electrodes should be cooler than the other glass between the electrodes, then the heating would automatically be increased. This is true because the cooler glass would have a higher resistance. Heating in Joule effect is proportional to the power drawn. The current is constant because of the series effect, but the resistance is higher in the infinitely small section which is cooler. Following the relationship of Power=$IR^2$, the amount of power through the cooler glass is increased and the temperature increases until the glass approaches the temperature of the surrounding glass. This tends to balance the temperature distribution within the furnace.

BEST MODE FOR CARRYING OUT THE INVENTION

Figure 1:
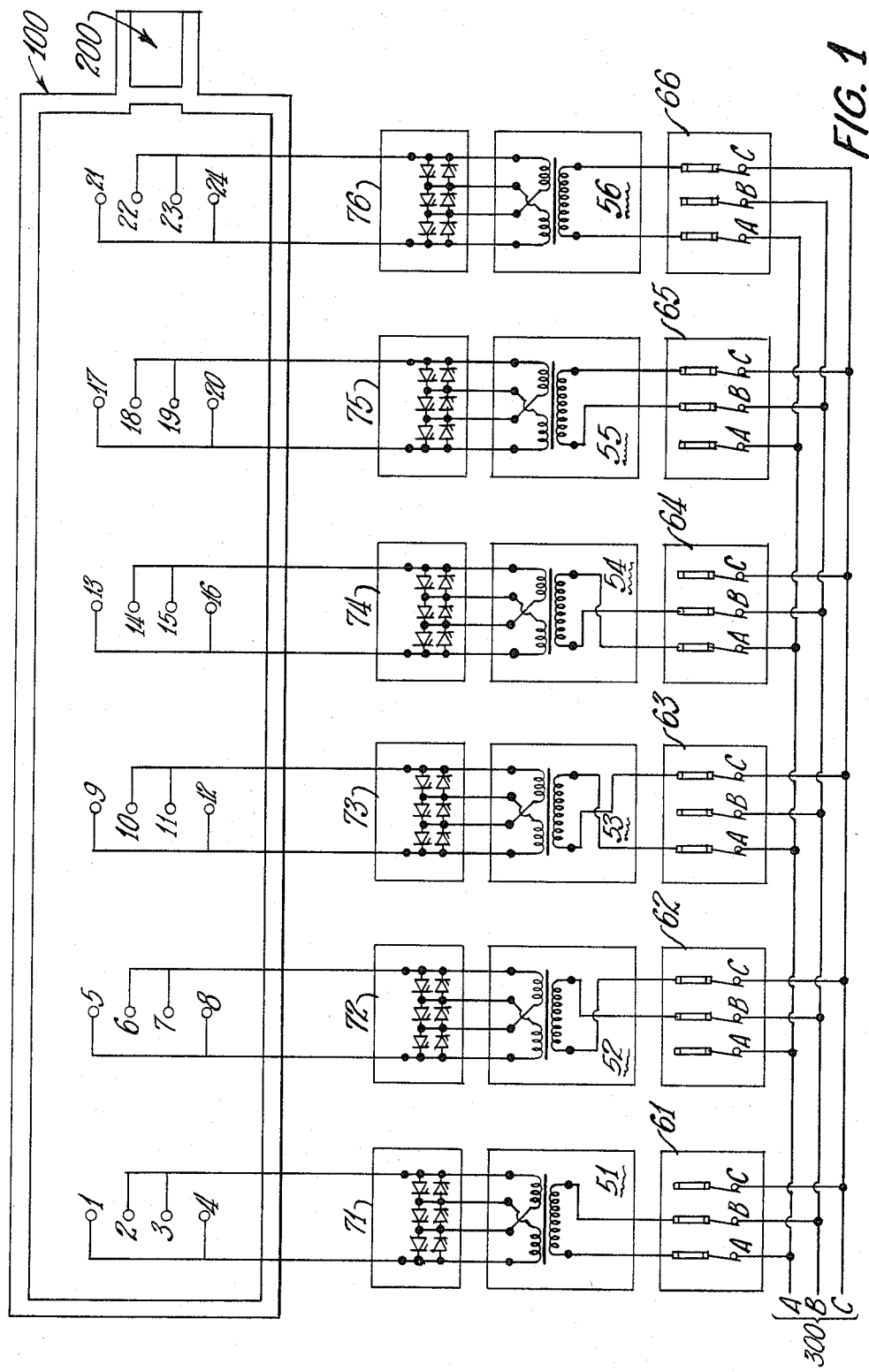
FIG. 1 is a diagramatic view of a glass melting furnace with the proposed interconnection of transformers, controllers and electrodes.

FIG. 1 is an embodiment in block diagram form of a glass melting furnace which practices the present invention. Six rows of four electrodes each make up an electrode array within receptacle 100. Electrodes 1-4 form the first row, electrodes 5-8 the second row, and so forth with electrodes 21-24 forming the sixth row. The sixth row of electrodes are closest to the forehearth 200 which is the feeder area for the molten glass to subsequent forming areas. Three wire, three phase electric power 300 is fed to the system. Each phase denoted by A, B, or C, can be tapped separately. A fused switch bank 61 is connected to phase A and B of the input power. Switch bank 61 feeds the power to transformer 51. Transformer 51 is a 1000 KVA power transformer similar to Model 3HVT 1000 maufactured by Magnetics, Inc., Division of Spang Industries, Sandy Lake, Pa. Transformer 51 is connected to a silicon controlled rectifier (SCR) based controller 71. Controller 71 limits the current draw on the output as is known in the art. One side of the output of controller 71 is connected to electrodes number 2 and 3 which are the centermost electrodes of the four electrodes which comprise the first row. The opposite side of controller 71 is connected to electrodes number 1 and 4. In this manner, current flows from electrode 1 to 2 and from electrodes 4 to 3. No current flows between electrodes 1 and 3 or between electrodes 2 and 4. Electrodes 1 through 4, which constitute a row, are equally spaced across the receptacle 100. In a steady state condition, the temperature of the glass is uniform, the spacing between the electrodes is the same; therefore the current flowing between electrodes 1 and 2 and electrodes 3 and 4 will be the same.

A second row of electrodes, referred to in FIG. 1 as electrodes 5-8, are connected in a similar manner to controller 72 which is connected to power transformer 52. Power transformer 52 receives its power from fused switch bank 62. As can be seen from FIG. 1, the phase connection of switch bank 62 is from C to B. Switch bank 61 was connected with a phase connection of A to B. This results in 60° phasing between the first row of electrodes 1-4 and the second row of electrodes 5-8. This phasing is continued down the rows in the order A to B, C to B, C to A, B to A, B to C and A to C. This phase angle can be varied by interconnectng each fused switch bank 61-66 in different orders. For example, if 120° phasing was desired between adjacent rows, then switch bank 61 would be connected A to B, switch bank 62 would be connected B to C and switch bank 63 would be connected C to A. Switch bank 64 is connected the same as switch bank 61; switch bank 65 is connected the same as switch bank 62; and switch bank 66 is connected the same as switch bank 63.

Figure 2:
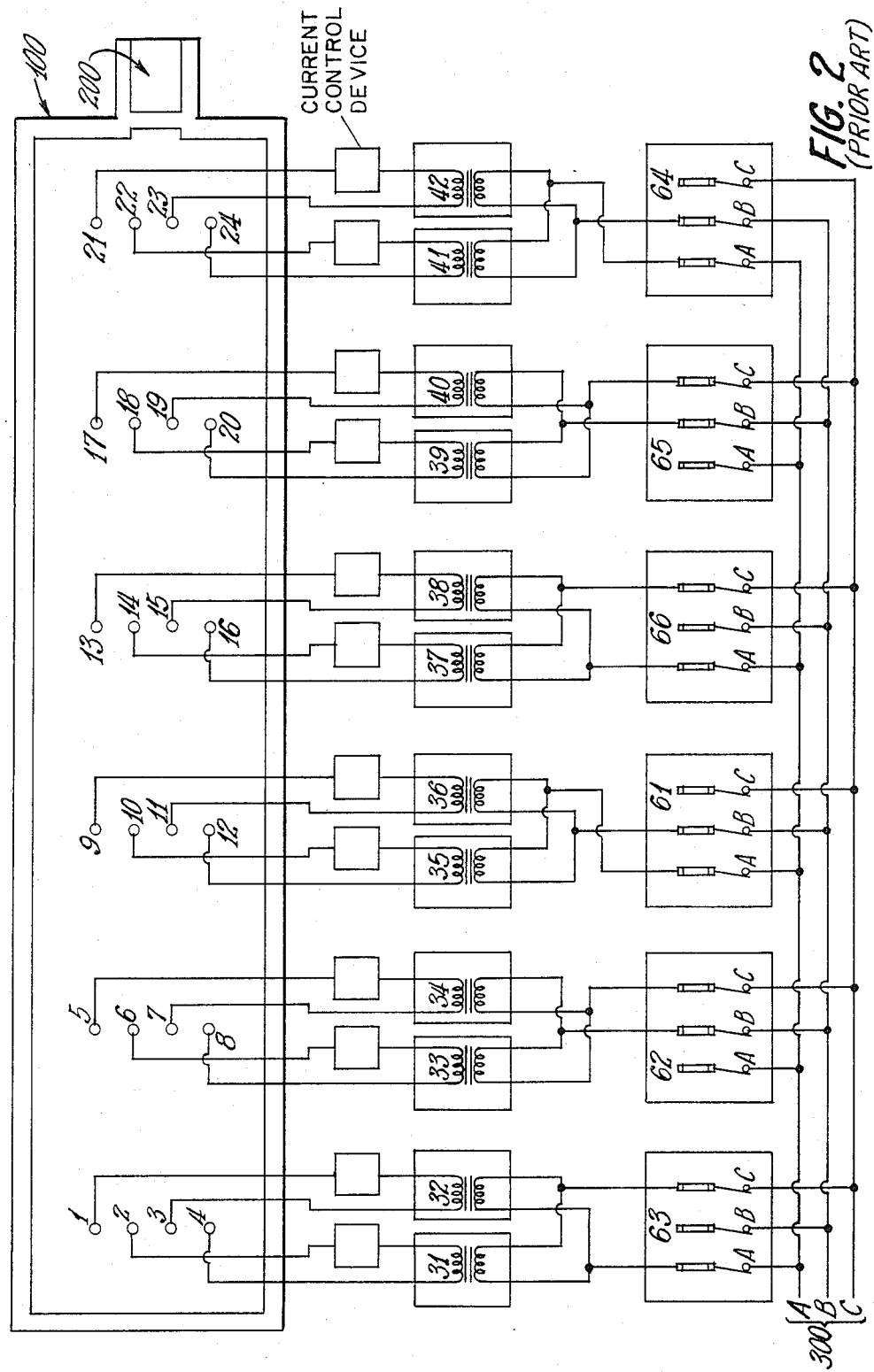
FIG. 2 is a diagramatic view of a prior art glass melting furnace showing the interconnections of the transformers, controllers and electrodes.

FIG. 2 shows the firing order of connections of a furnace such as described in Orton, U.S. Pat. No. 3,395,237. Similar fused switch banks 61-66 are used in Orton which interconnect transformer 31-42 to three phase electric power 300. An electrode array of electrodes 1-24 are within receptacle 100 which has an outlet or forehearth 200. Orton, however had two transformers; for example, 31 and 32 connected in parallel to the fused switch bank. These transformers were similar to Model 3HV0500, manufactured by Magnetics Inc., Division of Spang Industries, Sandy Lake, Pa. The physical size of Model 3HV0500 transformer is 78 inches wide, 74 inches high and 44 inches deep. The Model 3HV1000 transformer, as used in the present invention, is 90 inches wide, 86 inches high and 48 inches deep. A single 3HV1000 transformer occupies less space than two MOdel 3HV500 transformers. There is also an economic benefit from using higher capacity transformers in that one 1000 KVH transformer costs approximately sixty to seventy percent of the cost of two 500 KVA transformers.

Orton also proposed a cross electrode firing order. Transformer 31 of Orton is connected to electrodes 2 and 4, and transformer 32 is connected to electrodes 1 and 3. This produces a firing scheme wherein a current path exists between electrodes 2 and 4 and between electrodes 1 and 3. Current from both firing paths is present in the center of the furnace between electrodes 2 and 3. The center of the furnace is, therefore, hotter, because of the multiple current paths between electrodes numbered 2 and 3. The current invention has a firing order as described of 1 to 2 and 3 to 4. Current flows between electrodes 3 and 4 and between electrodes 1 and 2. No stray currents exist between electrodes 2 and 3. The convection currents are symetrical about the electrodes because of the balanced symetrical condition. The firing scheme of the present invention tends to be self balancing. If, for instance, the current-flow between electrodes 3 and 4 is increased, and current flow between 1 and 2 decreased, then the glass between electrodes 3 and 4 becomes hotter. Increased convection currents in the region will tend to mix the glass in regions away from the more conductive electrodes. The temperature of the glass in the conductive path between two electrodes, for instance between electrodes 1 and 2, also tends to be self balancing. This is true because the heating of a infinitely small cross section of glass is proportional to the power supplied. The power is equal to Ohm's law relationship $IR^2$ where I which is current is constant due to the SCR controllers and R is equal to the resistance of the area of glass between the electrodes. As the resistance increases because the glass is cooler, the power increases and, therefore, the heat increases. This is self-balancing because the resistance of the glass will decrease with increasing heat until the temperature of the cooler glass approaches the temperature of the remaining glass between the electrodes.

INDUSTRIAL APPLICABILITY

In the glass working arts, there has been a steady switch away from fossil fueled furnaces to all electric heated furnaces. These electric furnaces rely upon Joule heating of the molten glass wherein the glass acts as the resistance heating element. Glass which is normally an electrical insulator at room temperature becomes an electrical conductor at elevated temperatures. Within the glass's molten range, it has a negative coefficient of electrical resistance. Because the glass has a negative coefficient of resistance, the spacing of the electrodes and the current flow control to the electrodes within the furnace becomes critical. The spacing and control must prevent runaway current flow and hot spots within the furnace. The cost and size of these components, includng power transformers and controllers, constitutes a major portion of the cost of an installation.

This invention allows multiple electrodes to be connected to a higher capacity transformer in a parallel format thereby reducing the number of transformers and controllers required but without the resultant problems of runaway current draw or hot spots in the furnace.

I claim:

1. An electric resistance heated glass producing furnace comprising:
   (a) a receptacle having at least side and bottom walls to contain the molten glass;
   (b) an opening in one of the side walls at the end of the receptacle to withdraw the molten glass;
   (c) four electrodes spaced uniformly across the receptacle to form a row of electrodes which electrically conductively engage the molten glass;
   (d) multiple rows of electrodes spaced uniformly along the length of the receptacle;
   (e) a fused switch bank for each row of electrodes to receive the incoming power;
   (f) a power transformer having primary and secondary windings for each row of electrodes, said power transformer primary windings connected to the switch bank;
   (g) a current limiting controller for each row of electrodes, said controller having two input connections and a first and a second output connection, said input connections connected to the secondary windings of the power transformer; and
   (h) said four electrodes grouped into two electrode pairs within a given row of electrodes, the first of said pair of electrodes connected together to said first output of the controller and the second pair of said electrodes connected together to said second output of the controller such that the current flow in the molten glass can only be between adjacent electrodes within a row of electrodes.

2. An electric furnace as recited in claim 1 wherein the rows of electrodes are contained in the receptacle and are electrically connected through said limiting controller, transformer, and switch to three phase electric power such that the phase angle between adjacent rows is 120°.

3. An electric furnace as recited in claim 1 wherein the rows of electrodes are contained within the receptacle and are electrically connected to three phase electric power through said limiting controller, transformer, and switch such that the phase angle between adjacent rows is 60°.

4. An electric furnace as recited in claim 1 wherein the current limiting controller is a bank of silicon controlled rectifier controllers.

5. An apparatus for heating molten glass by Joule effect comprising:
   a receptacle for the molten glass; an array of electrodes in the receptacle adapted to electrically conductively engage the molten glass; the array of electrodes arranged in rows of four electrodes evenly spaced apart across the width of the receptacle, said rows of electrodes uniformly spaced along the length of the receptacle; a source of alternating current electrical power coupled through a switch, a transformer, to a controller, said controller having a first and a second output; and at least two of said four electrodes connected to the first output of said controller, and the remaining two of said four electrodes conected to the second output of said controller such that the only electrical path available through the molten glass within the row of electrodes is between adjacent electrodes within that row.

6. An apparatus as recited in claim 5 wherein each row of electrodes contains four electrodes, the center most two electrodes being connected to one side of the source of alternating current electrical power and the outer most two electrodes being connected to the other side of the source of alternating current electrical power.

7. An apparatus as recited in claim 5 wherein the rows of electrodes are uniformly spaced along the length of the receptacle, said rows being connected to three phase electrical power such that the phase angle between adjacent rows is 120°.

8. An apparatus as recited in claim 5 wherein the rows of electrodes are uniformly spaced along the length of the receptacle, said rows being connected to three phase electrical power such that the phase angle betwee adjacent rows is 60°.

9. A method of electrically heating molten glass by the Joule effect comprising the steps of:
   (a) placing an array of electrodes in a receptacle to electrically engage the molten glass;
   (b) arranging the array of electrodes into rows of electrodes spaced along the length of the receptacle;
   (c) configuring each row of electrodes to consist of four electrodes evenly spaced across the width of the receptacle;
   (d) interconnecting a single phase of a three phase source of alternating current electrical power through fused switch banks, power transformers, and current controllers, each of said current controllers having a first and a second output connection to each row of electrodes by connecting the center two of said four electrodes to the first output connection of said controller and connecting the remaining two of said four electrodes in the same row of electrodes to the second output connection of said controller such that the only current flow within a row of electrodes will be between adjacent electrodes within that row; and
   (e) connecting adjacent rows of electrodes through separate fused switch banks, power transformers; and controllers in a similar manner to subsequent phases of the three phase power source such that adjacent rows of electrodes can have either 60° or 120° phase difference in the alternating current power supplied to adjacent rows.

* * * * *